United States Patent
Wisniewski et al.

(10) Patent No.: US 11,114,218 B2
(45) Date of Patent: Sep. 7, 2021

(54) MECHANICAL STRESS ISOLATION CONDUCTORS IN LEAD FRAMES

(71) Applicant: Vitesco Technologies USA, LLC, Auburn Hills, MI (US)

(72) Inventors: Andrew Wisniewski, South Lyon, MI (US); Laura Church, Grosse Ile, MI (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 0 days.

(21) Appl. No.: 16/710,503

(22) Filed: Dec. 11, 2019

(65) Prior Publication Data

US 2021/0183538 A1 Jun. 17, 2021

(51) Int. Cl.
| | | |
|---|---|---|
| H01B 7/29 | (2006.01) | |
| H02B 1/20 | (2006.01) | |
| B29L 31/36 | (2006.01) | |
| B29K 101/12 | (2006.01) | |
| B29C 45/14 | (2006.01) | |

(52) U.S. Cl.
CPC ............... H01B 7/29 (2013.01); H02B 1/20 (2013.01); B29C 45/14336 (2013.01); B29K 2101/12 (2013.01); B29L 2031/36 (2013.01)

(58) Field of Classification Search
CPC ........ H01B 7/0081; H01B 7/009; H01B 7/08; H01B 7/16; H01B 7/20; H01B 12/14; H01R 9/03; H01R 9/07; H02B 1/20; B29C 45/14336; B29K 2101/12

USPC ........... 174/72 B, 74 R, 88 R, 117 R, 117 F, 174/117 FF; 361/600–678
See application file for complete search history.

(56) References Cited

U.S. PATENT DOCUMENTS

| | | | | |
|---|---|---|---|---|
| 5,234,515 | A * | 8/1993 | Sekkelsten | H01R 4/70 156/158 |
| 2009/0078450 | A1 * | 3/2009 | Miller | C09J 7/21 174/209 |
| 2011/0107835 | A1 * | 5/2011 | Campbell | B29C 45/1671 73/488 |
| 2015/0044960 | A1 * | 2/2015 | Hara | B29C 45/14811 454/254 |
| 2017/0098814 | A1 * | 4/2017 | Golubkov | H01R 9/00 |
| 2017/0141557 | A1 * | 5/2017 | Wimmer | H02G 15/04 |
| 2017/0322237 | A1 * | 11/2017 | Hanley | G01R 17/16 |
| 2018/0026250 | A1 * | 1/2018 | Mattmuller | H01M 2/206 429/121 |
| 2018/0298510 | A1 * | 10/2018 | Nishikawa | C25D 3/12 |

* cited by examiner

*Primary Examiner* — William H. Mayo, III

(57) ABSTRACT

An electrical device includes an electrically conductive member, an overmold material disposed about a portion of the electrically conductive member and a membrane disposed between the overmold material and at least a portion of the electrically conductive member. The membrane has a compressibility greater that a compressibility of the overmold material such that at least a portion of relative thermal expansion between the electrically conductive member relative to the overmold material is absorbed by the membrane.

17 Claims, 6 Drawing Sheets

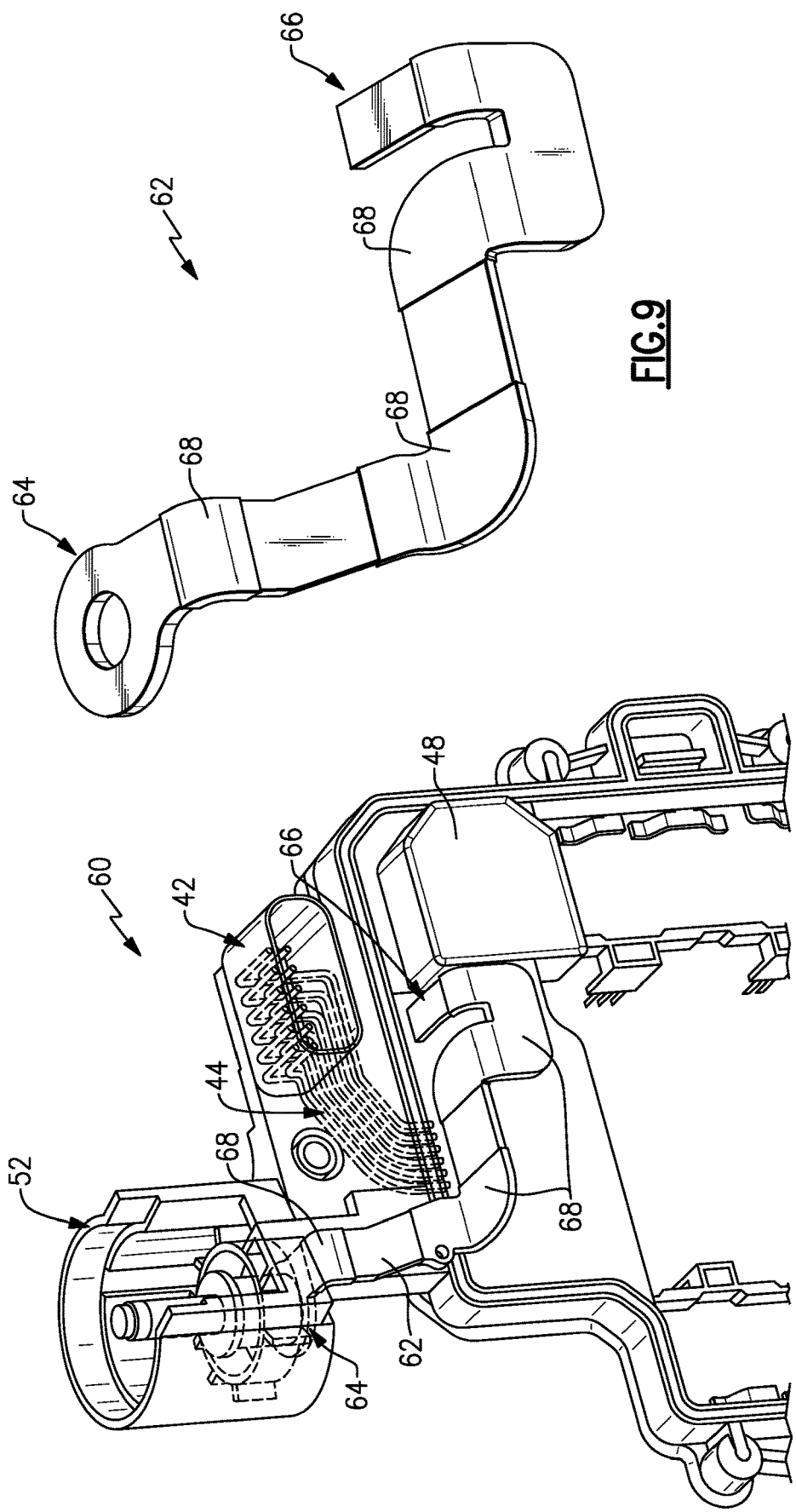

MECHANICAL STRESS ISOLATION CONDUCTORS IN LEAD FRAMES

TECHNICAL FIELD

The present disclosure relates to an overmolded electrical conduit. More particularly, the present disclosure relates to decouples relative thermal expansion of an electrical conduit from an overmolding.

BACKGROUND

Electric devices may include overmolded segments that protect electrical conduits. Moreover, the overmolded segments may encase delicate electrical connections to protect against exposure to outside elements. Plastic material is utilized to overmold the metal electrically conductive parts. The different materials may have different coefficients of thermal expansion. Different thermal coefficients of thermal expansion may result in undesired relative expansions during operation.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An electrical device according to an exemplary embodiment of this disclosure, among other possible things includes an electrically conductive member, an overmold material disposed about a portion of the electrically conductive member and a membrane disposed between the overmold material and at least a portion of the electrically conductive member. The membrane has a compressibility greater that a compressibility of the overmold material such that at least a portion of relative thermal expansion between the electrically conductive member relative to the overmold material is absorbed by the membrane.

In another example embodiment of the foregoing electrical device, the membrane comprises an elastic material and the overmold material comprises a thermoplastic material.

In another example embodiment of any of the foregoing electrical devices, the membrane is disposed about top, bottom and side surfaces of the electrically conductive member.

In another example embodiment of any of the foregoing electrical devices, the electrically conductive member comprises a bus bar with a first end and a second end that extend outward from the overmold material and the membrane is disposed over the bus bar and encapsulated on all sides with the over mold material.

In another example embodiment of any of the foregoing electrical devices, the membrane is disposed at several separate areas of the bus bar and is encapsulated entirely within the over mold material.

In another example embodiment of any of the foregoing electrical devices, the membrane comprises a melting temperature that is greater than a melting point of the overmold material.

In another example embodiment of any of the foregoing electrical devices, the electrical device comprises a mainframe and the electrically conductive member comprises a bus bar on one end and a connection to at least one electric conduit on a second end.

In another example embodiment of any of the foregoing electrical devices, the membrane includes a membrane thickness, wherein the membrane thickness is greater than a difference between thermal expansion of the electrically conductive member and the overmold material at a predefined operating temperature.

In another example embodiment of any of the foregoing electrical devices, the membrane thickness is uniform about the electrically conductive member.

In another example embodiment of any of the foregoing electrical devices, the membrane thickness is less than a thickness of the overmold material.

A mainframe assembly according to another non-limiting disclosed example embodiment includes, among other possible things, a connector portion including a plurality of conductors, a bus bar in electrical communication with some of the plurality of conductor, a mainframe portion formed from an overmold material encapsulating portions of the plurality of conductors and the bus bar and a membrane disposed between the overmold material of the main frame portion and at least a portion of the bus bar. The membrane has a compressibility greater that a compressibility of the overmold material such that at least a portion of relative thermal expansion between the electrically conductive member relative to the overmold material is absorbed by the membrane.

In another example embodiment of the foregoing mainframe assembly, the membrane comprises an elastic material and the overmold material comprises a thermoplastic material.

In another example embodiment of any of the foregoing mainframe assemblies, the membrane is disposed at several separate areas of the bus bar and is encapsulated entirely within the over mold material.

In another example embodiment of any of the foregoing mainframe assemblies, the membrane is disposed on the portions of the bus bar covered by the overmold material.

In another example embodiment of any of the foregoing mainframe assemblies, the membrane includes a membrane thickness, wherein the membrane thickness is greater than a difference between thermal expansion of the electrically conductive member and the overmold material at a predefined operating temperature.

A method of assembling an electrical device according to another disclosed non-limiting embodiment includes premolding a portion of an electrical conduit with an elastic membrane and molding the electrical conduit with an thermoplastic overmold material that covers all portions of the electrical conduit covered by the elastic membrane, wherein the elastic membrane has a compressibility greater that a compressibility of the thermoplastic overmold material such that at least a portion of relative thermal expansion between the electrically conductive member relative to the overmold material is absorbed by the elastic membrane.

In another example embodiment of the foregoing method, the elastic membrane is pre-molded to a membrane thickness that is greater than a difference between thermal expansion of the electrically conductive member and the thermoplastic overmold material at a predefined operating temperature.

In another example embodiment of the any of the foregoing methods, the membrane thickness is less than a thickness of the overmold material.

Another example embodiment of the any of the foregoing methods includes pre-molding separate and spaced apart portions of the electrically conductive member with the elastic membrane.

In another example embodiment of the any of the foregoing methods, the membrane thickness is uniform about the electrically conductive member.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 8 is perspective view of another example mainframe embodiment.

FIG. 9 is a perspective view of another example bus bar assembly embodiment.

DETAILED DESCRIPTION

Figure 1:
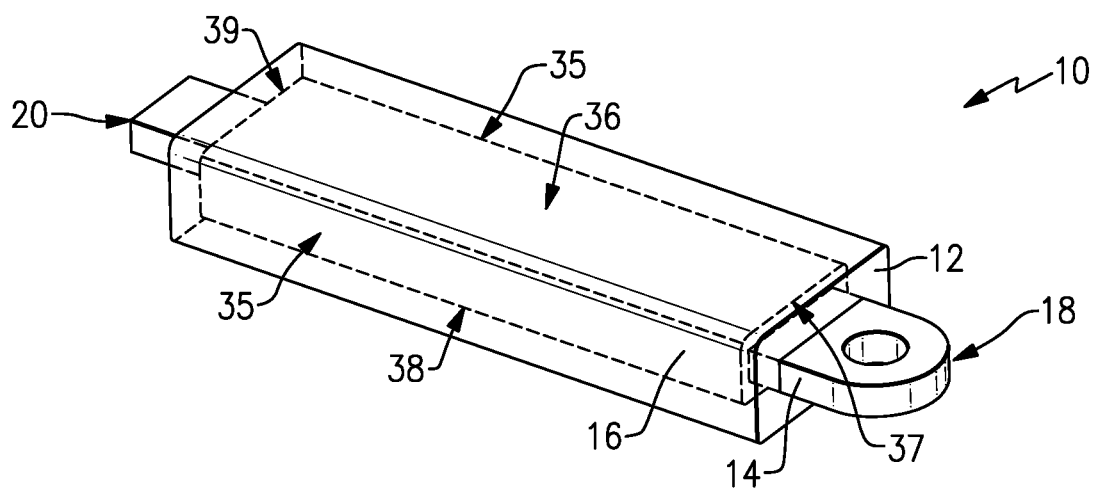
FIG. 1 is a perspective view of an example bus bar assembly embodiment.
Figure 2:
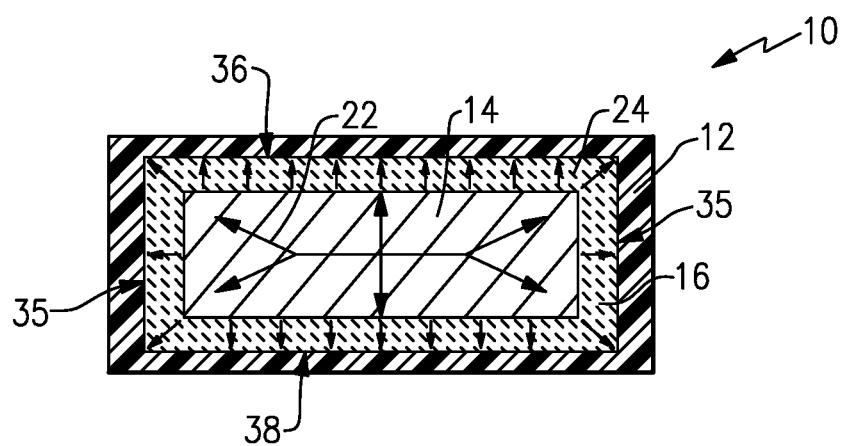
FIG. 2 is a schematic cross-section of the example bus bar assembly embodiment.

Referring to FIGS. 1 and 2, an example bus bar assembly 10 includes a bus bar 14 coated with a flexible, compressible membrane 16 and encased in an overmold material 12. The bus bar 14 is an electrically conductive metal material that expands and contacts according to a coefficient of thermal expansion that is different than that of the overmold material 12. The metal material of the bus bar 14 will expand at higher rate than that of the overmold material 12 and thereby exert mechanical stress on the overmold materials. Moreover, vibrations and other mechanical stresses experienced by the bus bar 14 can be transferred to the overmold material 12 at point locations and thereby result in overstressed areas.

The membrane 16 is disposed between the bus bar 14 and the overmold material 12 to decouple the bus bar 14 from the overmold material 12. Decoupling of the bus bar 14 from the overmold material 12 reduces a transference of vibrations and mechanical stress from the bus bar 14 to the overmold material 12. Moreover, the membrane 16 is compressible to absorb differences in thermal expansion between the bus bar 14 and the overmold material.

The bus bar assembly 10 includes a first end 18 and a second end 20 that extend out from the overmold material 12. The ends 18, 20 provide electrical connections to other conductors and or electrical devices. Top, bottom, side, front and back surfaces 36, 38, 35, 37, 39 of the membrane 16 are completely encased in the overmold material 12. Mechanical stresses schematically shown at 22 encountered by the bus bar 14 are transferred into the membrane 16. The membrane 16 has a compressibility that is greater than a compressibility of the overmold material 12. Accordingly, movement, stresses and vibrations on the bus bar 14 are transferred and at least partially absorbed by the membrane 16. Additionally, any residual movement, stress and vibrations that are not absorbed are evenly distributed, as shown schematically by arrows 24, throughout the surfaces 36, 38, 35, 37, 39 of the membrane 16 to eliminate points of highly concentrated stresses on the overmold material.

Figure 3A:
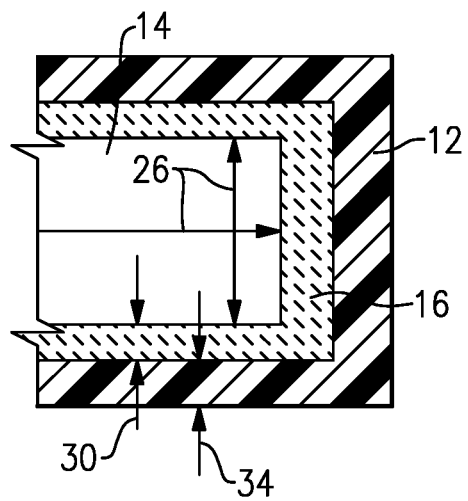
FIG. 3A is a schematic view of a portion of the example bus bar assembly in a first thermal condition.

FIG. 3A illustrates a partial cross-section of the bus bar assembly 10 in a first thermal state. The first thermal state represents a condition where the bus bar 14 is not significantly heated. In the example first thermal state, the membrane 16 is at a first thickness indicated at 30. The overmold 12 is also shown at a first thickness 34 and the bus bar 14 is shown at a first size indicated by arrows 26. The first size of the bus bar 14 includes a length, width and thickness (not shown).

Figure 3B:
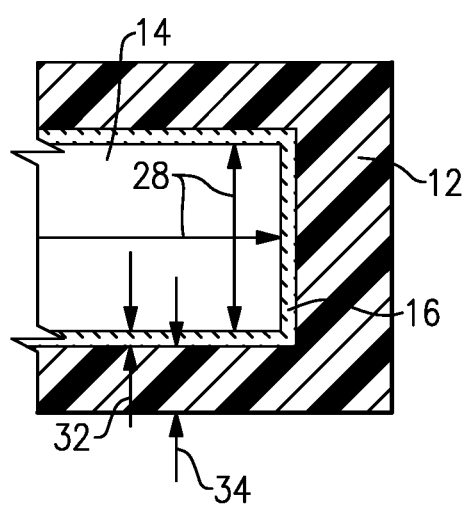
FIG. 3B is a schematic view of the portion of the example bus bar assembly in a second thermal condition.

FIG. 3B illustrates the partial cross-section of the bus bar assembly 10 in a second thermal state. The second thermal state represents a condition in which the bus bar 14 is heated and expanding due to thermal expansion. The overmold material 12 has a thermal coefficient of expansion that is much less than that of the bus bar 14 and therefore the thickness 34 remains substantially unchanged. The expanded size of the bus bar 14 is represented by arrows 28 that schematically show an expanded length and width. In the second thermal condition, the membrane 16 is compressed to a thickness 32 that is less than the thickness 30 at the first thermal state illustrated in FIG. 3A. Compression of the membrane 16 absorbs expansion of the bus bar 14 instead of transferring the loads directly to the overmold material 12. Accordingly, the membrane 16 mechanically decouples the bus bar 14 from the overmold material 12.

In one disclosed embodiment, the thickness 30 of the membrane 16 is less than that of the surrounding overmold material 12. The thickness 30 may be different or greater than the overmold material in some localized areas. The thickness 30 can be changed to compensate for an amount of expansion of the bus bar 14 expected for a known range of operation. As appreciated, the bus bar assembly 10 will operate within known operating conditions that include a known temperature range. The temperature range provides information utilized to determine an expected expansion of the bus bar 14 that is turn utilized to determine the thickness 30 of the membrane 16.

In one disclosed example, the membrane 16 comprises an elastic material and the overmold 12 comprises a thermoplastic material. The membrane elastic material is of a greater compressibility relative to the overmold material to compensate for the relative movement between the bus bar 14 and the overmold 12. The elastic material also includes a melting temperature above that of the overmold material 12 to enable insert injection molding operations to be utilized for fabrication of the bus bar assembly 10.

Figure 5:
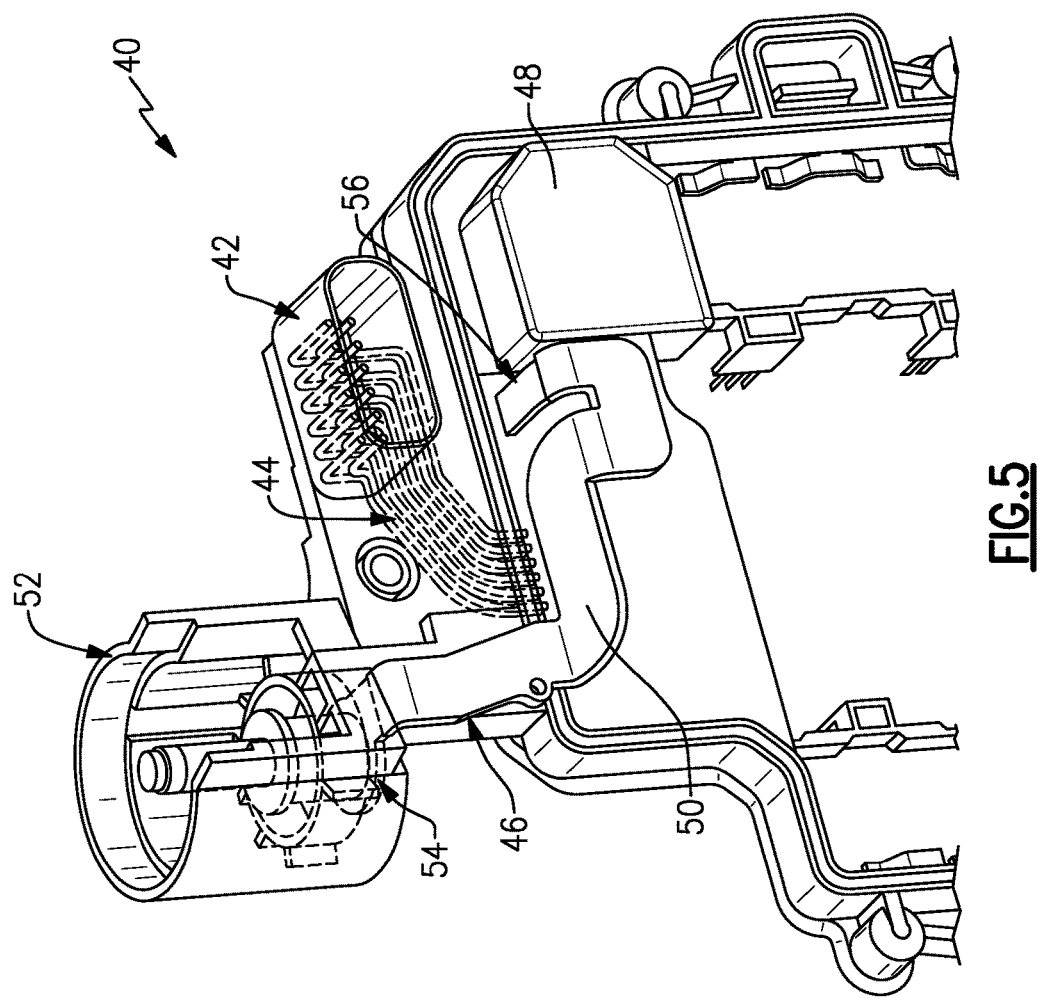
FIG. 5 is a sectioned view of a portion of the example mainframe assembly.
Figure 4:
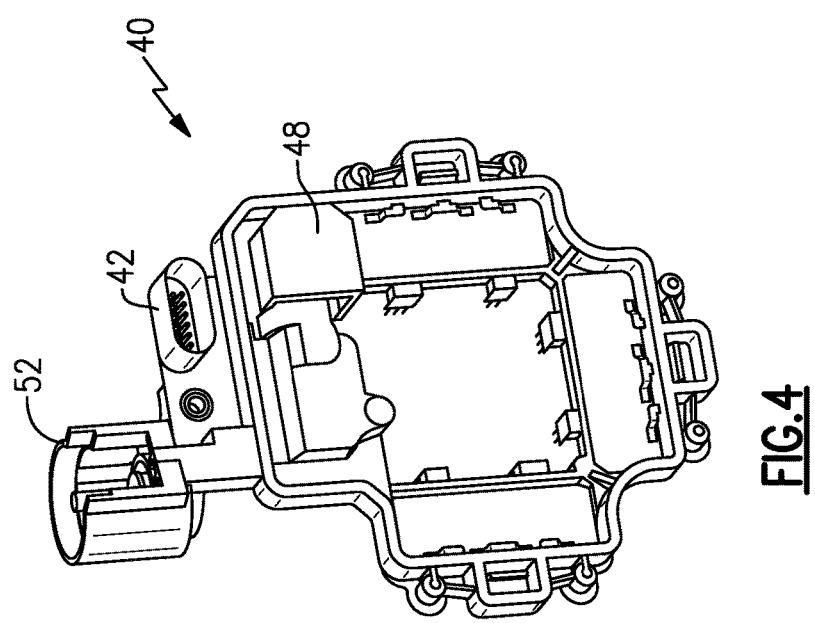
FIG. 4 is a perspective view of an example mainframe assembly embodiment.

Referring to FIGS. 4 and 5, a mainframe assembly 40 includes a first connector 52 and a second connector assembly 42 formed from overmold material 48. The mainframe assembly 40 includes a plurality of conductors 44 that are in electrical communication with a bus bar 46. The bus bar 46 and conductors 44 are encased in the overmold material to provide an integral electrical connection assembly that provides electrical communication to other electrical devices (not shown).

Figure 7:
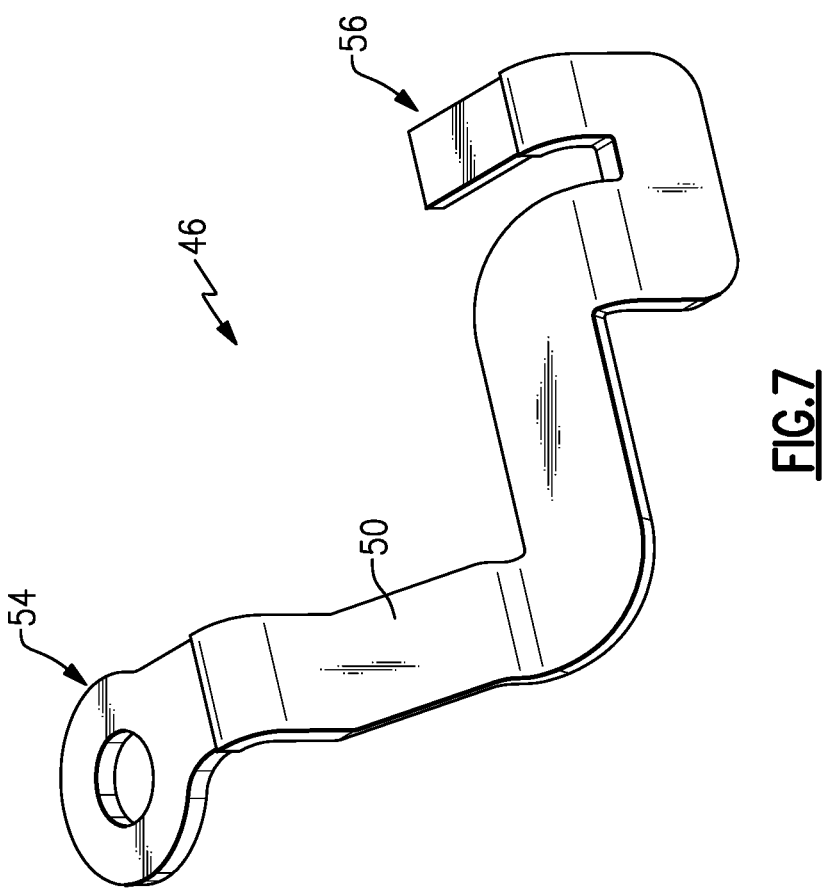
FIG. 7 is a perspective view of an example bus bar assembly embodiment.
Figure 6:
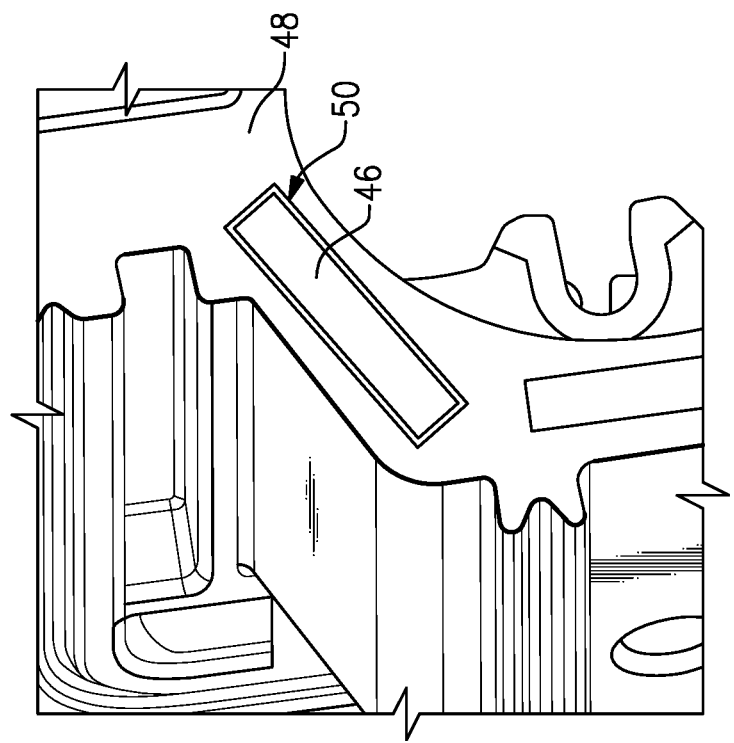
FIG. 6 is a sectional view of a portion of the example mainframe assembly.

Referring to FIGS. 6 and 7 with continued reference to FIGS. 4 and 5, the example bus bar 46 is coated with a membrane 50 at portions that are encapsulated with the overmold material 48. A first end of the bus bar 46 extends into the first connector 52. A second end 56 of the bus bar 46 is encased in the overmold 48, but not encased in the membrane 16 to provide cover for connections between the bus bar 14 and other conductors 44. In this disclosed embodiment, the bus bar 46 is coated on most surfaces in a single continual uniform thickness. The bus bar 46 is shaped to correspond with a desired electrical routing within the assembly 40. It should be appreciated that other shapes, sizes and lengths of the bus bar 46 may be utilized and are within the scope of this disclosure.

Referring to FIGS. 8 and 9, another example mainframe assembly 60 includes a bus bar 62 that is encapsulated within overmold material 48. In this disclosed example embodiment, the bus bar 62 includes membrane portions 68 that are disposed at several separate areas between the first end 64 and second end 66 of the bus bar 62. The separate membrane portions 68 are areas of high stress concentrations that benefit from the compressibility of the membrane material. The separate membrane portions 68 are spaced apart such that portions of the bus bar 62 between the membrane portions 68 are in direct contact with the overmold material 48. Moreover, the spaced apart orientations of the membrane target high stress areas and enable additional electrical connections along the bus bar 62.

Although a bus bar is disclosed by way of example throughout this disclosure, other electrical conduits and devices that are overmolded could benefit from the application of a membrane and are within the scope and contemplation of this disclosure.

Figure 10:
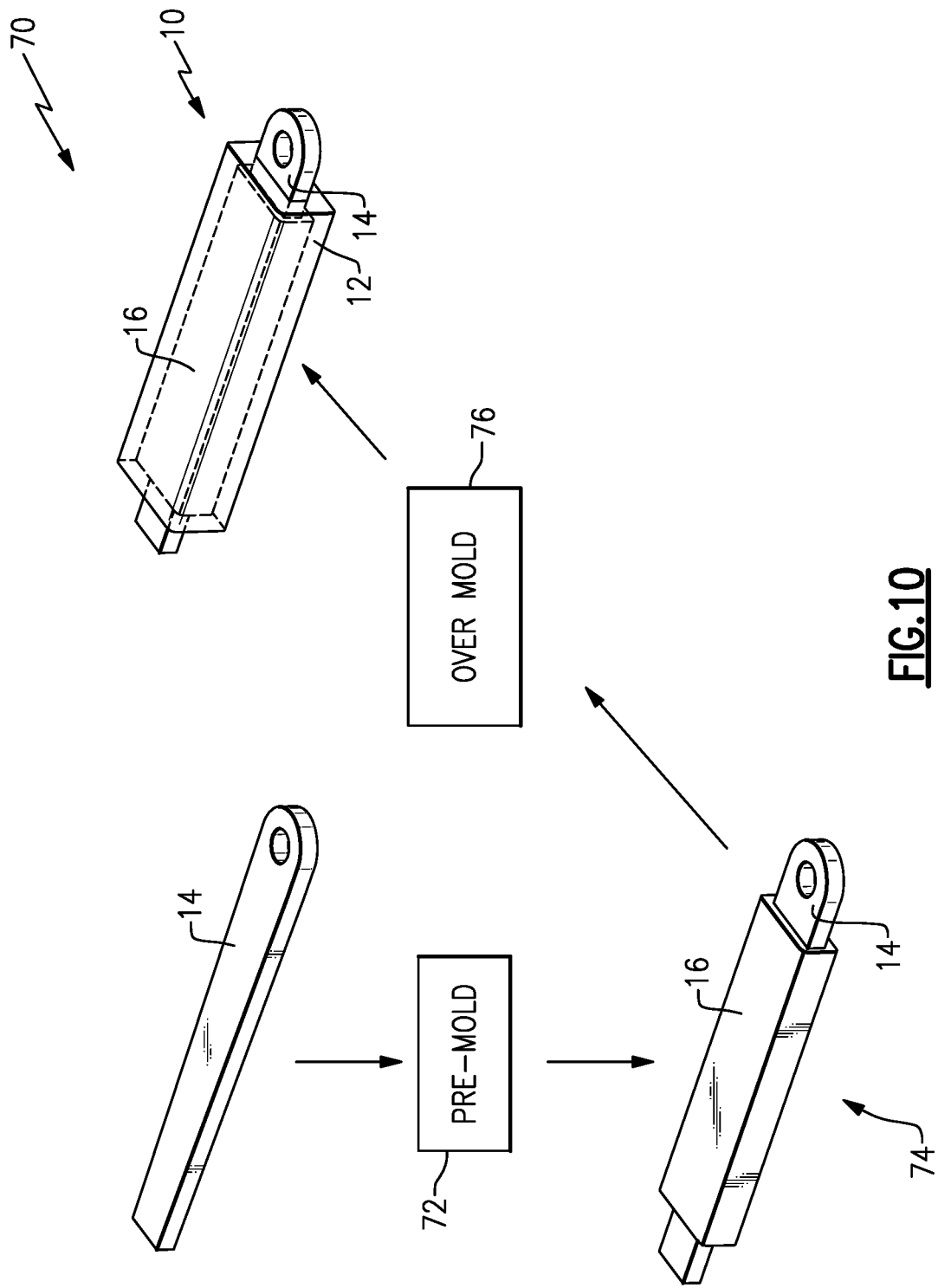
FIG. 10 is a schematic view of method of assembling an electrical device including an example bus bar assembly.

Referring to FIG. 10, an example method of assembling an electrical device is schematically shown at 70. The method includes an initial step pre-molding the membrane material around a bus bar 14 as shown at 72. In the pre-molding operation, the bus bar 14 is placed into an insert mold and the membrane material injected into the mold. The pre-molding operation may include any known molding operation compatible with the elastic material utilized to form the membrane 16. Once the pre-molding is complete, a sub-assembly as indicated at 74 is formed that includes the bus bar 14 partially encased in the membrane 16. Ends of the bus bar 14 remain uncovered to facilitate electrical connections.

The pre-mold sub-assembly 74 is then inserted into an overmold for an overmolding operation as indicated at 76. In the overmolding operation 76, the sub-assembly is overmolded with the overmold material 12. The temperature required to melt the overmold material 12 is less than the melting temperature of the membrane material to prevent undesired melting and distortion of the membrane material. The overmold operation 76 may form a completed part, such as the disclosed example mainframes 40, 60 or a sub-assembly of a larger electrical part. Accordingly, the example overmolding operation 76 may form a completed assembly with the bus bar 14 and membrane sub-assembly 74 and/or some intermediate portion utilized to form a completed assembly.

Once the overmolding process is complete, a completed assembly as indicated at 10 is provided that includes the membrane 16 disposed between the bus bar 14 and the overmold 12. Although the disclosed example illustrates the membrane 16 as a single continuous surface along the bus bar 14, the membrane 16 may be disposed at separate spaced apart areas of the bus bar 14. Moreover, more than one of the sub-assemblies 74 can be utilized for the final device.

Accordingly, the disclosed bus bar assembly 10 and mainframe assemblies 40, 60 include a membrane 16 between a bus bar 14 and an overmold 12, 48 that isolates the overmold 12 from movement and stresses generated by the bus bar 14.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not just a material specification in any limiting sense. A worker of ordinary skill in the art would understand that certain modifications could come within the scope of this disclosure. For these reasons, the following claims should be studied to determine the true scope and content of this disclosure.

What is claimed is:

1. An electrical device comprising:
an electrically conductive member;
an overmold material disposed about a portion of the electrically conductive member; and
a membrane disposed between the overmold material and at least a portion of the electrically conductive member, wherein the membrane has a compressibility greater that a compressibility of the overmold material such that at least a portion of relative thermal expansion between the electrically conductive member relative to the overmold material is absorbed by the membrane; wherein the electrically conductive member comprises a bus bar with a first end and a second end that extend outward from the overmold material and the membrane is disposed over the bus bar and the membrane encapsulated on all sides with the overmold material.

2. The electrical device as recited in claim 1, wherein the membrane comprises an elastic material and the overmold material comprises a thermoplastic material.

3. The electrical device as recited in claim 1, wherein the membrane is disposed about top, bottom and side surfaces of the electrically conductive member.

4. The electrical device as recited in claim 1, wherein the membrane is disposed at several separate areas of the bus bar and is encapsulated entirely within the over mold material.

5. The electrical device as recited in claim 1, wherein the membrane comprises a melting temperature that is greater than a melting point of the overmold material.

6. The electrical device as recited in claim 1, wherein the electrical device comprises a mainframe and the electrically conductive member comprises a bus bar on one end and a connection to at least one electric conduit on a second end.

7. The electrical device as recited in claim 1, wherein the membrane includes a membrane thickness, wherein the membrane thickness is greater than a difference between thermal expansion of the electrically conductive member and the overmold material at a predefined operating temperature.

8. The electrical device as recited in claim 7, wherein the membrane thickness is uniform about the electrically conductive member.

9. The electrical device as recited in claim 7, wherein the membrane thickness is less than a thickness of the overmold material.

10. A mainframe assembly comprising:
    a connector portion including a plurality of conductors;
    a bus bar in electrical communication with some of the plurality of conductors;
    a mainframe portion formed from an overmold material encapsulating portions of the plurality of conductors and the bus bar; and
    a membrane disposed between the overmold material of the main frame portion and at least a portion of the bus bar, wherein the membrane has a compressibility greater that a compressibility of the overmold material such that at least a portion of relative thermal expansion between the electrically conductive member relative to the overmold material is absorbed by the membrane;
    wherein the membrane comprises an elastic material and the overmold material comprises a thermoplastic material, and the membrane is disposed at several separate areas of the bus bar and the membrane is encapsulated entirely within the over mold material.

11. The mainframe assembly as recited in claim 10, wherein the membrane is disposed on the portions of the bus bar covered by the overmold material.

12. The mainframe assembly as recited in claim 10, wherein the membrane includes a membrane thickness, wherein the membrane thickness is greater than a difference between thermal expansion of the electrically conductive member and the overmold material at a predefined operating temperature.

13. A method of assembling an electrical device comprising:
    pre-molding a portion of an electrical conduit with an elastic membrane; and
    molding the electrical conduit with an thermoplastic overmold material that covers all portions of the electrical conduit covered by the elastic membrane such that the elastic membrane is encapsulated entirely by the overmold material, wherein the elastic membrane has a compressibility greater that a compressibility of the thermoplastic overmold material such that at least a portion of relative thermal expansion between the electrically conductive member relative to the overmold material is absorbed by the elastic membrane.

14. The method as recited in claim 13, including pre-molding the elastic membrane to a membrane thickness that is greater than a difference between thermal expansion of the electrically conductive member and the thermoplastic overmold material at a predefined operating temperature.

15. The method as recited in claim 14, wherein the membrane thickness is less than a thickness of the overmold material.

16. The method as recited in claim 13, including pre-molding separate and spaced apart portions of the electrically conductive member with the elastic membrane.

17. The method as recited in claim 13, wherein the membrane thickness is uniform about the electrically conductive member.

* * * * *